May 27, 1952      A. H. MITTAG      2,598,433
PHASE SHIFTING NETWORK
Filed April 29, 1949
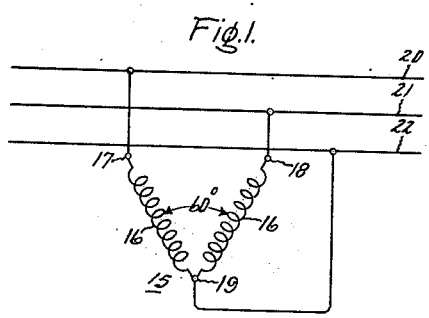
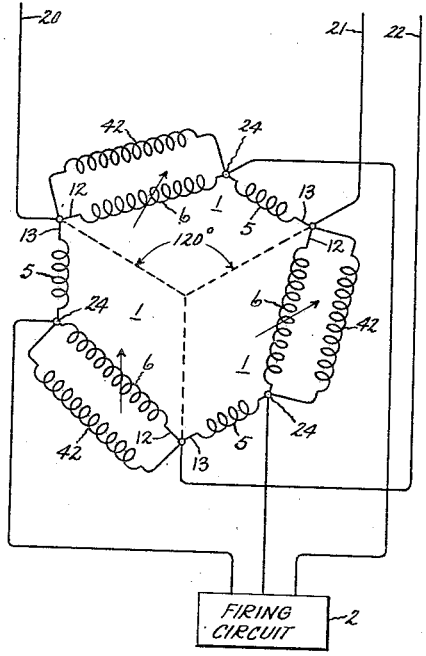
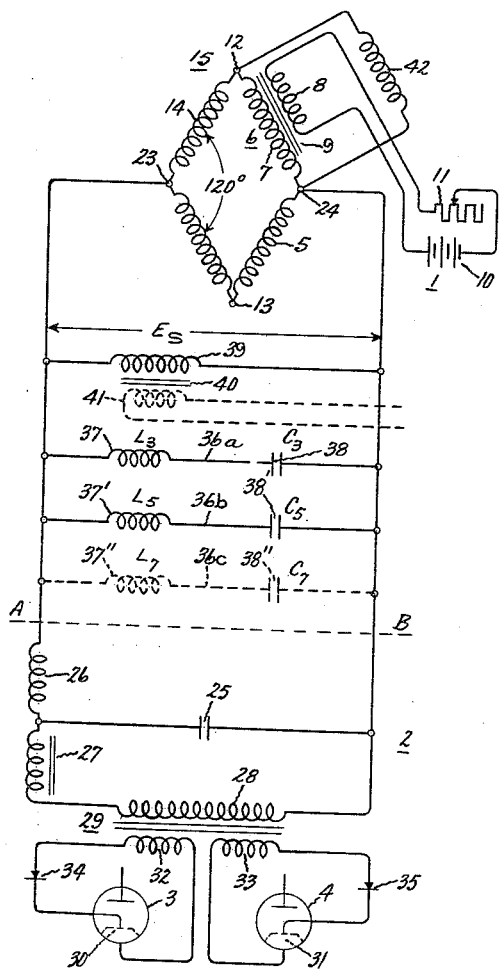
Inventor:
Albert H. Mittag,
by Prowell S. Mack
His Attorney.

Patented May 27, 1952

2,598,433

UNITED STATES PATENT OFFICE 2,598,433

PHASE SHIFTING NETWORK

Albert H. Mittag, Schenectady, N. Y., assignor to General Electric Company, a corporation of New York Application April 29, 1949, Serial No. 90,529

3 Claims. (Cl. 323—122)

1

My invention relates to phase shifting networks and more particularly to improvements in static impedance phase shifting networks of the type utilizing a combination of fixed and variable reactance elements to effect a variation in phase relation between an output voltage and an input voltage of the network.

In an application for United States Letters Patent of John C. Price, Serial No. 84,208, filed March 29, 1949, and assigned to the same assignee as the present invention, there is disclosed a phase shifting network comprising at least two reactance elements such as a fixed inductive reactance and a variable inductive reactance connected in series relation across components of input voltage having various phase relations. In turn, an output voltage is taken from the network between a junction point of the reactive elements and a neutral or other displaced terminal of the network for energizing a load circuit, the voltage of which is to be shifted relative to the input voltage.

Networks of this type have been found particularly useful in connection with tube rectifiers and inverters in order to effect a shift in phase of the voltage applied to a control electrode of the rectifier or inverter tubes relative to the anode voltage, and thereby to control the operation of such rectifiers and inverters.

It is an object of my invention to provide certain improvements in networks of the type mentioned whereby, particularly in connection with tube rectifiers and inverters, their utility is increased.

In accordance with one aspect of my invention, I provide a fixed inductive reactance connected in shunt relation across a variable inductive reactance in a phase shifting network to facilitate the starting of resonance in a firing circuit connected to the network. In accordance with another aspect of my invention, I provide a plurality of filter elements, each composing at least one inductive reactance and one capacitive reactance, connected across the output voltage of the phase shifting network, to improve the wave form of the output voltage of the network. Such filter elements may also serve to provide the load with a leading power factor as required for operation of the network. According to still another aspect of my invention, I provide a non-

2 linear impedance connected across the output of the network to prevent the output voltage from increasing due to increase in load impedance by loading the network. I have found this feature to be useful in preventing double-firing in tube rectifiers and inverters. Such a non-linear impedance may also serve, in the case of tube rectifiers and inverters, as the primary winding of a transformer to supply potential to holding anodes, the currents whereof are often desirably shifted with the firing potentials.

My invention will be better understood from the following description taken in connection with the accompanying drawing, and its scope will be pointed out in the appended claims.

In the drawing Fig. 1 is a diagrammatic representation of a single phase embodiment of an impedance phase shifting network of the type mentioned including the improvements of my invention, and Fig. 2 is a diagrammatic representation of a three phase embodiment of such a network.

Referring now to the drawing, I have shown a schematic representation of a static impedance phase shifting network of the type hereinbefore mentioned, having the phase shifting elements thereof arranged in a branch circuit 1, employed to supply a firing circuit 2 for a pair of ignitrons 3 and 4. Branch circuit 1 is shown as comprising a fixed inductive reactance element 5 and a variable inductive reactance element 6. Variable reactance element 6 is preferably a saturable reactor having an alternating current winding 7 and a direct current winding 8 arranged on a core 9 in any suitable manner to effect the desired change in reactance by D.-C. saturation. Direct current winding 8 is arranged to be energized from a suitable D.-C. source illustrated as a battery 10 and provided with a suitable means, such as a variable resistance 11, to vary the D.-C. saturating current.

Branch circuit 1 is provided with a pair of input terminals 12 and 13 which are connected to the end terminals of secondary 14 of a transformer 15. Transformer 15 is represented as a three phase transformer having a primary winding 16 provided with a pair of end terminals 17 and 18 and a neutral terminal 19, connected respectively to conductors 20, 21, and 22 of a three phase supply. The "input angle" of the voltages from terminals 19 to 17, and 19 to 18 is therefore 60°. Secondary winding 14 is provided with a neutral terminal 23. The portions of winding 14 on either side of point 23 are so arranged that the angle of the voltages between terminals 23 and 12, and 23 and 13, this angle being the "input angle" to network 1, is 120°.

The output voltage of network 1, indicated as $E_s$ in the drawing, is taken at the junction point 24 between reactance elements 5 and 6, and neutral point 23 of transformer secondary 14.

Attention is next directed to circuit arrangement of firing circuit 2 and ignitrons 3 and 4, shown in the figure as being below the broken line AB. Firing circuit 2 represents a portion of the load element connected across output voltage $E_s$ of network 1, and as illustrative of a typical contemplated load I have shown a type of ignitor firing circuit described in my United States Patent 2,362,294 granted November 7, 1944, and assigned to the same assignee as the present invention.

This circuit typically comprises a firing capacitor 25, connected to be energized through a linear reactor 26 from the output voltage $E_s$ of the phase shifting network. Firing capacitor 25 when fully charged, discharges through a self-saturating or firing reactor 27 to energize the primary winding 28 of a transformer 29. Ignitors 30 and 31 respectively of ignitrons 3 and 4, the latter having anode voltages displaced 180° in phase, are connected to be energized from secondary windings 32 and 33 of transformer 29.

Ignitor 30 is connected to be energized through a rectifier 34 from the terminals of secondary 32, while ignitor 31 is connected to be energized through a rectifier 35 from the terminals of secondary 33.

I have found that a saturable reactor of the type employed for variable reactance element 6 is apt not to have a linear reactance characteristic. If such is the case, considerable distortion of output voltage $E_s$ may result which will interfere with good operation of firing circuit 2. To overcome such distortion I provide a plurality of filter circuits 36 (36a, 36b, 36c, etc.) tuned to resonance with the harmonics (third, fifth, seventh, etc.) of output voltage $E_s$.

It will be noted that despite the use of firing capacitor 25, firing circuit 2 has a lagging power factor. However, in accordance with the aforementioned disclosure of Price, one of the requirements for successful operation of phase shifting network 1 is that the load impedance connected thereto have an opposite, or in this particular case, a leading power factor angle equal to one-half the input angle. In the illustrated example the input angle of network 1 is 120°, thereby necessitating a load impedance power factor angle of 60° or a power factor of 50 per cent. In accordance with my invention, I make use of filter circuits 36 to provide such a leading power factor, as well as to improve the characteristic of output voltage $E_s$.

Each of filter circuits 36 is shown as comprising an inductive reactance and a capacitive reactance. In particular, filter circuit 36a, for example, comprises a reactor 37 and a capacitor 38, designated respectively in the drawing as $L_3$ and $C_3$, the combination thereof being tuned to the third harmonic of output voltage $E_s$. Filter circuits 36b and 36c comprise like elements and are tuned to the fifth and seventh harmonics respectively. It will be understood that only as many filter circuits as are desired need be employed. In some cases, no filter circuits may be required, while in other cases it may be desirable to use one or more. In a single phase application of the type illustrated, I have found that filter circuits tuned to the third and fifth harmonics give good results in the elimination of distortion in output voltage $E_s$.

In some cases, I have found that a firing circuit such as firing circuit 2 may get into a double firing mode of operation causing double firing of ignitrons 3 and 4 during each cycle, due to high output voltage of the phase shifting network. In one case, I found that voltage $E_s$ increased from 380 to 570 volts under conditions of double firing. I have found that such a rise in voltage may be prevented by the use of a non-linear inductive reactance element 39 connected across voltage $E_s$. When voltage $E_s$ tends to rise, reactor 39 loads network 1 thereby preventing a rise in $E_s$ and minimizing the tendency for firing circuit 2 to go into its double firing mode of operation. Reactor 39 may also serve as the primary of a transformer 40, the latter being provided with a suitable secondary 41, which may be employed, for example, to supply the holding anodes (not shown) of ignitrons 3 and 4. The currents of such holding anodes are preferably shifted in phase with the firing circuit when the latter is shifted over an angle of 120° or more.

According to another aspect of my invention, I provide a means to facilitate firing of tube rectifiers or inverters, such as ignitrons 3 and 4, when the firing circuit therefor, such as firing circuit 2, is energized from a phase shift network, such as network 1. Considering again the illustrated embodiment, I have found that to set in resonance firing circuit 2 and cause firing of ignitors 30 and 31, it is sometimes necessary to produce a certain amount of saturation of variable reactance 6 by a suitable saturating current in winding 8 thereof. Such saturating current is provided by source 10 through action of control device 11. While, for the sake of simplicity, device 11 has been represented as a variable resistance, actually it may be any of a number of devices such as an amplidyne generator, an electronic amplifier or a magnetic amplifier. If the action of such a device is not exceedingly rapid, the output current of ignitrons 3 and 4 when firing starts, may rise to abnormal levels, thereby causing circuit interruptions or other undesirable effects. Increasing the D.-C. saturating current in winding 8 advances the firing angle of ignitors 30 and 31 and consequently increases the rectified voltage output of ignitrons 3 and 4.

I have found that by the use of a suitable fixed inductive reactance element 42 connected in parallel relation with variable reactor 6, resonance of firing circuit 2 and firing of ignitors 30 and 31 may be effected with zero saturating current in winding 8 of reactor 6.

In other words, the net reactance of reactors 6 and 42 between terminals 12 and 24, when reactor 6 is unsaturated, is substantially the reactance of reactor 42, and the effect of variable reactance 6 may be practically neglected in effecting firing of ignitors 30 and 31. Stated otherwise the value of the reactance of variable reactor 6 is substantially greater than the reactance of reactor 42 when reactor 6 is unsaturated as when no control current or when a relatively small control current is caused to flow through winding 8. When reactor 6 is partially saturated, however, the net reactance between terminals 12 and 24 is substantially affected by both reactors 6 and 42, and accordingly a wider operating range of reactor 6 may be employed than would be the case if reactor 42 were not connected in parallel with reactor 6. Stated otherwise the value in ohms of reactance of both reactors 42 and 6 are comparable when reactor 6 is partially saturated and for a particular condition of partial saturation, the reactances of these two reactors are equal. Thus, when the reactor 6 is fully saturated, the reactance in ohms of reactor 6 is necessarily substantially less than the reactance of reactor 42. If the fixed reactor 42 is omitted, the starting of resonance is impossible if the current through control winding 8 is small or zero, since the reactance of reactor 6 is too large. Resonance may be initiated by increasing the value of current through control winding 8. Such an increase in current through control winding 8, however, has the effect of advancing the ignitor phase angle too much so as to cause an excessive current to flow through the valves 3 and 4. If the fixed reactor 42 is used according to the invention, the net reactance of fixed reactor 42 and of variable reactor 6 is sufficiently low to facilitate starting of resonance even when no current is supplied to control winding 8. Since the reactance of fixed reactor 42 is greater than the reactance of variable reactor 6 when reactor 6 is fully saturated, the net reactance of these two parallel connected elements is maintained at a value large enough to permit a wide angle of phase shift. Thus, the effect of fixed reactor 42 is to lower the net reactance to a value such that starting of resonance is facilitated without reducing the net reactance of this parallel connected circuit to such an extent as to interfere with the primary phase shifting function of the circuit.

While I have shown and described a single phase embodiment of my invention, it will be obvious to those skilled in the art that my invention is not limited to single phase applications, but may also be utilized in polyphase applications. As an example of a polyphase application, I have shown in Fig. 2 a three phase embodiment of my invention in which elements similar to the elements in the arrangement of Fig. 1 have been assigned like numerals. Referring now to Fig. 2, there is shown a three phase impedance phase shifting network having three like branch circuits I arranged in a delta connection. Each of the branch circuits I comprises a fixed inductive reactance element 5 and a variable inductive reactance element 6 connected in series relation. Each of branch circuits I is provided with input terminals 12 and 13 and a delta connection is effected by connecting terminal 12 of one branch circuit to terminal 13 of another, and so on, to form a symmetrical closed loop. Junction points 12—13 are connected to conductors 20, 21 and 22 of a three phase supply. The "input angle" to the network is accordingly 120°.

While a neutral point in the input voltage supply could be provided for use in the output of the network, I have chosen to show an output arrangement in which a neutral is not used. In particular, I show a three phase output arrangement in which junction points 24 between fixed reactance elements 5 and variable reactance elements 6 constitute the output terminals of the network.

In accordance with my invention, as in the arrangement of Fig. 1, I provide a fixed inductive reactance element 42 connected in parallel relation with each of variable reactors 6. By the use of reactors 42 the starting of resonance in a firing circuit 2 which may be connected to the output terminals of the phase shifting network is materially facilitated.

While I have shown and described a preferred embodiment of my invention, it will be understood that my invention may well take other forms and I, therefore, aim in the appended claims to cover all such changes and modifications as fall within the true spirit and scope of my invention.

What I claim as new and desire to secure by Letters Patent of the United States is:

1. An impedance phase shifting network comprising first fixed inductive reactive means and saturable inductive reactive means connected in series relation therewith to form a branch circuit of said network, a winding for controlling the degree of saturation of said saturable reactive means, means for causing control current to flow through said winding, second fixed inductive reactive means connected in parallel relation with said variable inductive reactive means, the reactance of said saturable reactive means being substantially greater than the reactance of said second reactive means when said control current is zero and being substantially less than the reactance of said second reactive means when said saturable reactive means is fully saturated, input terminals being provided at the extremities of said branch circuit, an intermediate junction between said first fixed and variable inductive reactive elements constituting one output terminal, circuit connections being provided for impressing between said input terminals voltage components having a predetermined phase displacement therebetween and constituting the voltage input angle of said network, a second output terminal being provided for said network dependent upon said input angle, and an output circuit connected to said output terminals said output circuit including an element having a non-linear impedance characteristic.

2. An impedance phase-shifting network comprising first fixed inductive reactive means and saturable inductive reactive means connected in series relation therewith to form a branch circuit of said network, second fixed inductive reactive means connected in parallel relation with said variable inductive reactive means, input terminals being provided at the extremities of said branch circuit, an intermediate junction between said first fixed and variable inductive reactive elements constituting one output terminal, circuit connections being provided for impressing between said input terminals voltage components having a predetermined phase displacement therebetween and constituting the voltage input angle of said network, a second output terminal being provided for said network at a point thereon dependent upon said input angle, and an output circuit connected to said output terminals, said output circuit including an element having a non-linear impedance characteristic.

3. An impedance phase-shifting network comprising first fixed inductive reactive means and saturable inductive reactive means connected in series relation therewith to form a branch circuit of said network, second fixed inductive reactive means connected in parallel relation with said variable inductive reactive means, input terminals being provided at the extremities of said branch circuit, an intermediate junction between said first fixed and variable inductive reactive elements constituting one output terminal, circuit connections being provided for impressing between said input terminals voltage components having a predetermined phase displacement therebetween and constituting the voltage input angle of said network, a second output terminal being provided for said network dependent upon said input angle, and an output circuit connected to said output terminals and having a substantially constant value of impedance and a power factor angle equal to one-half of said input angle and of opposite sign to the inductive reactive characteristic of said network.

ALBERT H. MITTAG.

REFERENCES CITED

The following references are of record in the file of this patent:

UNITED STATES PATENTS

| Number | Name | Date |
| --- | --- | --- |
| 1,755,060 | Gay | Apr. 15, 1930 |
| 1,921,786 | Suits | Aug. 8, 1933 |
| 1,926,275 | Fitzgerald | Sept. 12, 1933 |
| 1,965,439 | Stoller | July 3, 1934 |
| 2,042,234 | Lyle | May 25, 1936 |
| 2,189,896 | Gutzmann | Feb. 13, 1940 |
| 2,408,461 | Wickerham | Oct. 1, 1946 |
| 2,442,214 | Short | May 25, 1948 |
| 2,444,715 | Walker | July 6, 1948 |